Figure 1:
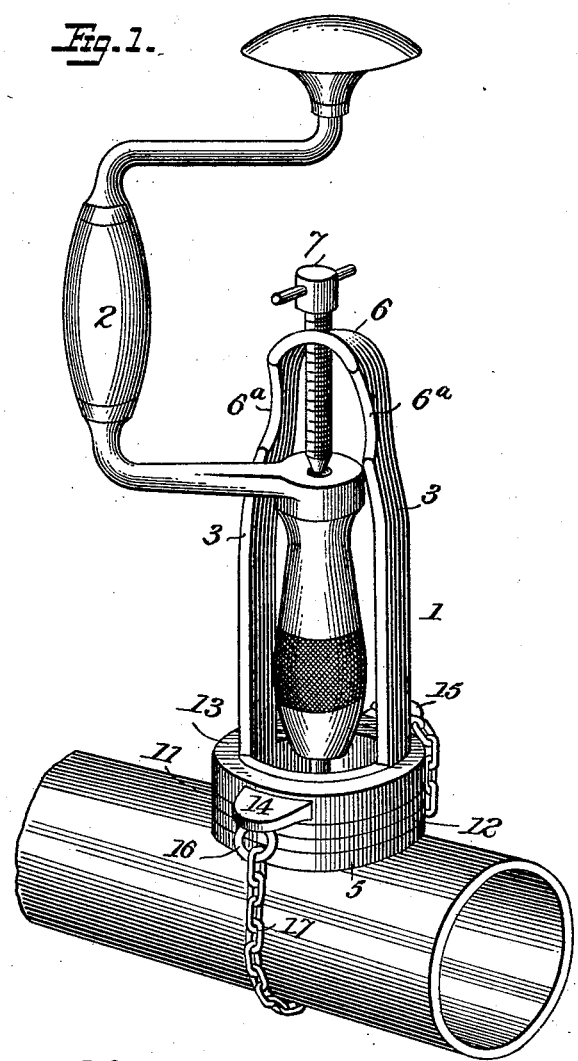

(No Model.) 2 Sheets—Sheet 1.
J. W. DUFF.
ROTARY SUPPORT FOR HAND DRILLS.

No. 529,023. Patented Nov. 13, 1894.

Witnesses
Jno. G. Hinkel
E. Everett Ellis

Inventor
J. W. Duff
By Loren Freeman
Attorneys

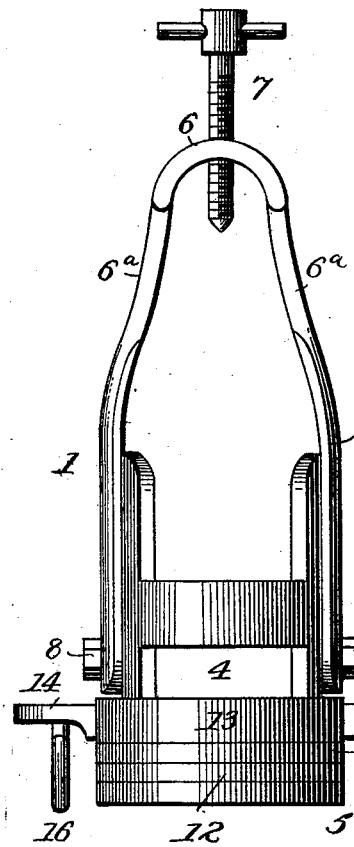
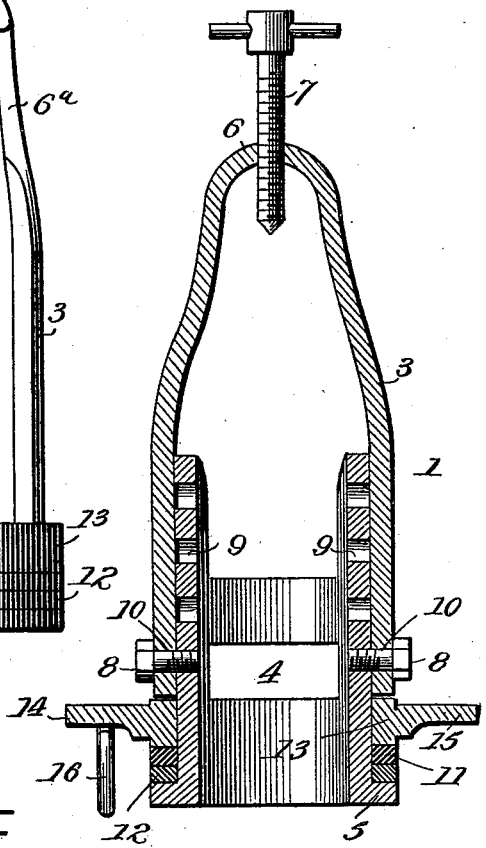
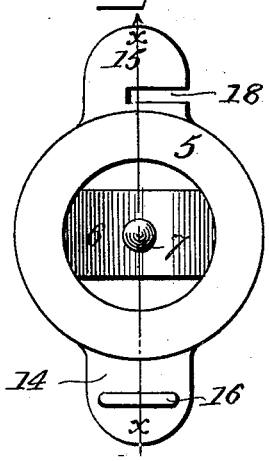

UNITED STATES PATENT OFFICE.

JOHN WESLEY DUFF, OF OLD ORCHARD, MAINE, ASSIGNOR TO WM. J. MEWER AND THE DUFF CONSTRUCTION COMPANY, OF SAME PLACE.

ROTARY SUPPORT FOR HAND-DRILLS.

SPECIFICATION forming part of Letters Patent No. 529,023, dated November 13, 1894.

Application filed December 11, 1893. Serial No. 493,428. (No model.)

*To all whom it may concern:*

Be it known that I, JOHN WESLEY DUFF, a citizen of the United States, residing at Old Orchard, in the county of York and State of Maine, have invented certain new and useful Improvements in Rotary Supports for Hand-Drills, of which the following in a specification.

This invention relates to certain new and useful improvements in rotary adjustable supports or attachments for drills; and it consists substantially in such features of construction, arrangement, and combinations of parts as will hereinafter be more particularly described.

Heretofore whenever it has been desirable for any purpose to drill a hole in permanent iron structures, such as heat conducting pipes, mains, radiators, and the like, it has been necessary to remove the structure either in part or entirety, and carry the same to a machine shop and drill the hole in a lathe in the usual well known manner. As is quite evident, all this requires a great deal of time, besides being expensive, and causing a great deal of inconvenience both to the workman and the party having the work done. It has been attempted in some instances to overcome the disadvantages attending such an operation by using an ordinary hand operating ratchet drill, but to do the work properly the drill has to be constantly backed up from time to time as it enters the metal, besides being very difficult to hold in place when the object is of such shape as not to furnish an even bearing therefor. The use of a hand ratchet drill has therefore been discarded in many instances as being unsuited for the purpose.

The present invention has for its object to provide a rotary adjustable support or attachment for an ordinary hand-drill which shall enable such drill to be effectually employed for drilling holes in metallic structures of whatever shape or contour, and without removing the structure or the part thereof to be drilled.

A further object of the invention is to provide a device of the character referred to which can be quickly applied and removed, and one which does not require any alteration whatever in the construction or operation of the drill itself.

A still further object of the invention is to provide a rotary adjustable support or attachment for ordinary hand drills which shall enable the degree of penetration of the drill to be quickly followed or taken up so as to furnish a uniform purchase or working bearing for such drill. And a still further object is to provide a support or attachment for the purpose named which shall be cheap to manufacture, simple in construction, and one which requires no special manipulation or handling during the operation of drilling; all as will appear more fully hereinafter when taken in connection with the accompanying drawings, in which—

Figure 6:
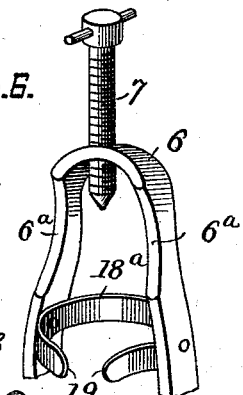
Figure 7:
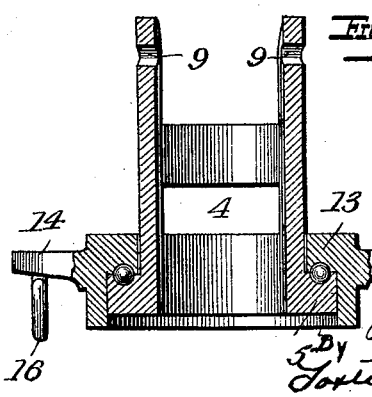

Figure 1 represents a view in perspective of the preferred embodiment of my invention, the said view indicating in what manner the rotary adjustable support is attached to a pipe or other object in which a hole is to be drilled, and likewise showing an ordinary brace and bit or other simple form of hand drill as employed in connection therewith. Fig. 2 is a vertical elevation of that form of the device wherein the yoke is adjustable to suit or accommodate drills of different heights or lengths. Fig. 3 is a similar view illustrating a rigid yoke. Fig. 4 is a vertical sectional elevation of Fig. 5 on the line $x$—$x$. Fig. 5 is a bottom or plan view; and Fig. 6 is a view in detail representing the devices for supporting the drill while centering the same to begin operation. Fig. 7 is a transverse sectional view in detail.

In carrying my invention into effect I provide a rotary adjustable support or attachment into which a drill is readily slipped; and which is also formed or provided with a bearing surface to rest against the pipe, radiator or other object in which the hole is to be drilled. I also provide means for clamping the support or attachment firmly and securely in place so as to prevent any slipping during the drilling operation.

That part of my improved drill support or attachment which is fitted to the object to be drilled is made so as to be stationary or fixed, while the main body of the device rotates with the drill during the drilling operation. I also provide an adjustable follower by which the feed of the drill is taken up from time to time, so that an equal working bearing is always furnished for said drill, and the operations rendered more effective.

Generally stated my invention is intended to comprehend a portion to be attached to and held in fixed relation with the part or object to be drilled; a rotary adjustable portion to be carried around or rotated by the drill in operation, and which by its adjustment is adapted to drills of different lengths; and an adjustable device which shall take up or follow the feed of the drill as it is caused to enter the material. Hence it will be seen that my invention is capable of many changes or modifications in its structual form, as well as its general arrangement, and I do not wish to be understood as limiting myself strictly to either of the embodiments which I have herein furnished as examples or illustrations.

Referring to the accompanying drawings, 1, represents the main portion of my improved rotary adjustable drill support, and 2, indicates an ordinary hand or breast drill such as is commonly employed by mechanics in the various trades. The said rotary adjustable support is constructed of a circular or other shaped frame or yoke 3, which in the constructions shown in Figs. 2 and 4 for the purpose of lightness is cut out at 4, and which is formed or provided at one end with a circular or other shaped ring or flange 5, the outer surface of which is preferably flat, and which surface is that part which is placed against or comes into contact with the pipe, radiator, or other structure to which my improvement may be attached for the purposes mentioned. It will be observed on reference to Figs. 2 and 3 that the said yoke or frame 3 is formed or provided with an arch 6, and this arch is provided at its upper portion with an adjustable follower or take up 7, by which my improved device or drill support may be adjusted from time to time to take up or compensate for the feed or degree of penetration of the drill. In this way an equal bearing for the drill is always furnished or provided, and thus obviating the necessity of having to back up the drill by blocks similarly as has to be done in the ordinary use of a ratchet drill for the same purpose.

As will be observed on reference to Fig. 2, the arch 6 is made separate from the yoke or frame, and is extensible or adjustable with respect thereto by means of the screws 8, 8, which pass through openings 9, 9, formed in opposite sides of the yoke and an opening 10 in each side of the arch at or near the lower ends thereof. In this way my improved attachment or support can be employed in connection with drills of considerable length, by simply extending or adjusting the arch to correspond. On reference to Fig. 3 however, I have shown the arch and yoke in one piece or integral with each other; and in this instance too the said arch is intended usually to be of a height about corresponding to the usual, or standard length of drill, so that but little extension or adjustment to lengths will be required, and such adjustments as then may be found necessary can easily be effected by means of the adjustable follower or take-up. In either construction the follower or take-up 7 is employed and by referring to Fig. 1 it will be seen in what manner the same is made to rest or bear upon the top of a drill to maintain the latter down to its work during operation.

Surrounding the yoke above the ring or flange 5 is an anti-friction device preferably constituted of two washers 11, 12, and also surrounding the said yoke above the washers is a loose collar or ring 13 in which the yoke is free to turn during the operation of drilling. The said collar or ring 13 is provided at or on opposite sides with offsets or projections 14, and 15, the former having attached or secured thereto a ring 16 in which is secured one end of a chain, cable or other fastening device 17, designed to be placed around the structure to be drilled, in the manner shown in Fig. 1, so as to afford a secure means of attachment. The projection 15 is cut or slit at 18 so as to receive the chain and bind the same securely after it has been passed around the structure to be drilled. The said collar or ring 13 remains stationary during the rotary movement of my improved support with the drill, while the friction is all sustained upon the friction washers 11, 12 as will be evident. In this connection I desire to state that instead of using the said washers I may in some instances resort to the use of a ball bearing, such for instance as is shown in Fig. 7, which would perhaps be very desirable. It will be understood therefore that this part of my invention is intended to comprehend such change. Also as a construction to be included as within my invention, I may sometimes flange the collar or ring 13, as shown in Fig. 7, in which case the anti-friction device or ball-bearings will be set or contained within the ring 5 as shown. In some instances also I notch or cut out portions of the sides of the arch, as shown at 6ª so as to better accommodate the handles or other operating devices of some forms of the ordinary ratchet drills at present in use.

As an additional feature also of my invention I locate or arrange within or between the sides of the arch a circular or other shaped spring-catch 18ª, the two ends of which project outwardly to one side as shown at 19, Fig. 6, and are slightly spread apart so as to more readily enable a drill to be slipped through or passed between them when preparing to drill or bore a hole. This device or attachment is intended to receive and support the drill in such manner as to better enable the same to be properly centered before beginning the work of drilling. The device may be constructed in any suitable way and may be either not permanently attached to the arch and simply held in place by its own resiliency while being used; or, the same may be attached to or supported by the arch in such manner as to be a permanent part of the arch. The purpose of said catch will be perfectly clear, and I desire to state that I do not limit myself in any manner as to the construction thereof, and neither do I confine myself as to its particular location, since it is evident that the same or analogous device could be used in many different ways.

From the description and illustration furnished, it is thought the operation of my improvement will be fully understood. It will be seen that after the support has been properly attached to the structure to be drilled, and the drill inserted into place and properly centered, the drilling may then be accomplished by the turning of the hand or breast drill in the ordinary way. During the operation the resistance offered by the material to the entrance of the drill will be sufficient to maintain the ring or flange of the yoke out of frictional contact with the surface of the structure being drilled. Hence no marring of the surface of the latter will be had.

As the drill enters the material or is fed in the follower or take-up is simply turned or adjusted to compensate such feed; and in this way an even and regular bearing for the drill is afforded. It will be seen that I am thus enabled to use an ordinary hand drill or breast drill; and it will also be seen that the work of drilling in stationary metallic structures is facilitated.

I am not confined to the particular shape of the several parts herein described, neither am I confined to the particular connections or details explained, for it is obvious that a great many immaterial changes could be resorted to and still be within the scope of my invention.

Without limiting myself to the details of construction and arrangement shown, I claim—

1. The herein described support for hand-drills, the same comprising a loose collar or ring adapted for attachment to the object to be drilled, a frame or yoke rotatable in said collar or ring, a ball-bearing, and a follower or feed take-up, as set forth.

2. The herein described support for hand-drills, the same comprising a loose collar or ring adapted for attachment to the object to be drilled, a yoke or frame rotatable in said collar or ring, an extensible arch attached to said yoke or frame, and an adjustable follower or feed take-up, as set forth.

3. The herein described support for hand-drills, the same comprising a loose collar or ring adapted for attachment to the object to be drilled, a yoke or frame rotatable in said collar or ring, an extensible arch attached to said yoke or frame, a ball-bearing for said yoke or frame, and an adjustable follower or feed take-up, as set forth.

4. The herein described support for hand-drills, the same comprising a loose collar or ring and a chain for attachment of the support to the object to be drilled, a rotary yoke or frame working in said loose collar or ring, an extensible arch attached to said yoke or frame, and an adjustable follower or feed take-up, as set forth.

5. The herein described support for hand-drills, the same comprising a loose collar or ring and a chain adapted for fixed attachment to the object to be drilled, a rotary part working in said collar or ring and provided with an extensible arch, an anti-friction device, and an adjustable screw follower or feed take-up, substantially as set forth.

6. The herein described support for hand-drills, the same comprising a loose collar or ring provided with a flange, a rotary part working in said collar or ring and also provided with a flange, anti-friction devices contained between said flanges, and a follower or feed take-up, substantially as set forth.

7. The herein described attachment or support for hand-drills, the same comprising a loose collar adapted for attachment to the object to be drilled, a rotary part working in said collar, anti-friction washers, and an adjustable screw follower or feed take-up, as set forth.

8. In a support or attachment of the character referred to, the arch provided with a centrally arranged ring-shaped spring having its ends brought together and then bent apart, as shown and for the purpose set forth.

In testimony whereof I have signed my name to this specification in the presence of two subscribing witnesses.

JOHN WESLEY DUFF.

Witnesses:
H. FAIRFIELD,
LUTHER R. MOORE.